United States Patent
Kumazawa

(10) Patent No.: US 7,436,548 B2
(45) Date of Patent: Oct. 14, 2008

(54) PRINTER CONTROLLER, PRINTING SYSTEM, AND RECORDING MEDIUM THEREFOR

(75) Inventor: Masaru Kumazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 555 days.

(21) Appl. No.: 11/131,406

(22) Filed: May 18, 2005

(65) Prior Publication Data

US 2005/0206945 A1    Sep. 22, 2005

Related U.S. Application Data

(63) Continuation of application No. 09/212,393, filed on Dec. 16, 1998, now Pat. No. 6,967,743.

(30) Foreign Application Priority Data

Jun. 30, 1998    (JP) ................................. 10-184195

(51) Int. Cl.
*G06K 15/00*    (2006.01)
(52) U.S. Cl. ..................... 358/1.9; 358/1.14; 358/468
(58) Field of Classification Search ................. 358/1.3, 358/1.15, 1.9, 3.27, 1.16, 1.17, 474, 475, 358/476, 477, 478, 479, 480, 481, 482, 483, 358/484, 485, 486, 1.14, 3.26, 426.02, 426.11, 358/468, 443, 448, 471; 271/3.14, 243, 244, 271/245
See application file for complete search history.

(56) References Cited

U.S. PATENT DOCUMENTS

| 5,726,966 | A | * | 3/1998 | Sugaya ...................... 369/59.18 |
| 5,819,666 | A | * | 10/1998 | Ishikawa et al. ............. 101/483 |
| 5,915,127 | A | * | 6/1999 | Ogawa et al. .................. 710/58 |
| 6,078,400 | A | * | 6/2000 | Mizutani .................... 358/1.14 |
| 6,122,073 | A | | 9/2000 | Miyasaka |

FOREIGN PATENT DOCUMENTS

| JP | 2-217281 | 8/1990 |
| JP | 9-114618 | 5/1997 |
| JP | 9-198203 | 7/1997 |

* cited by examiner

*Primary Examiner*—Jerome Grant, II
(74) *Attorney, Agent, or Firm*—Westerman, Hattori, Daniels & Adrian, LLP.

(57) ABSTRACT

The invention provides a printer controller capable of ensuring printing data without deteriorating a performance of the printer without provision of a storage means for storing printing data in the controller.

The controller receives printing data for each page from a host, transfers the printing data to a printer and controls the printer to print the printing data while monitoring states thereof, wherein the controller comprises: an analyzing unit that analyzes the printing data and manages the number of pages transferred to the printer; and an error processing unit that informs error data and the number of pages of which printing have been completed to the host when an error in which data is not assured occurs in the printer.

16 Claims, 18 Drawing Sheets

Fig.4

| HEADER | ERROR CODE | THE NUMBER OF PRINTED DATA | FLAG |

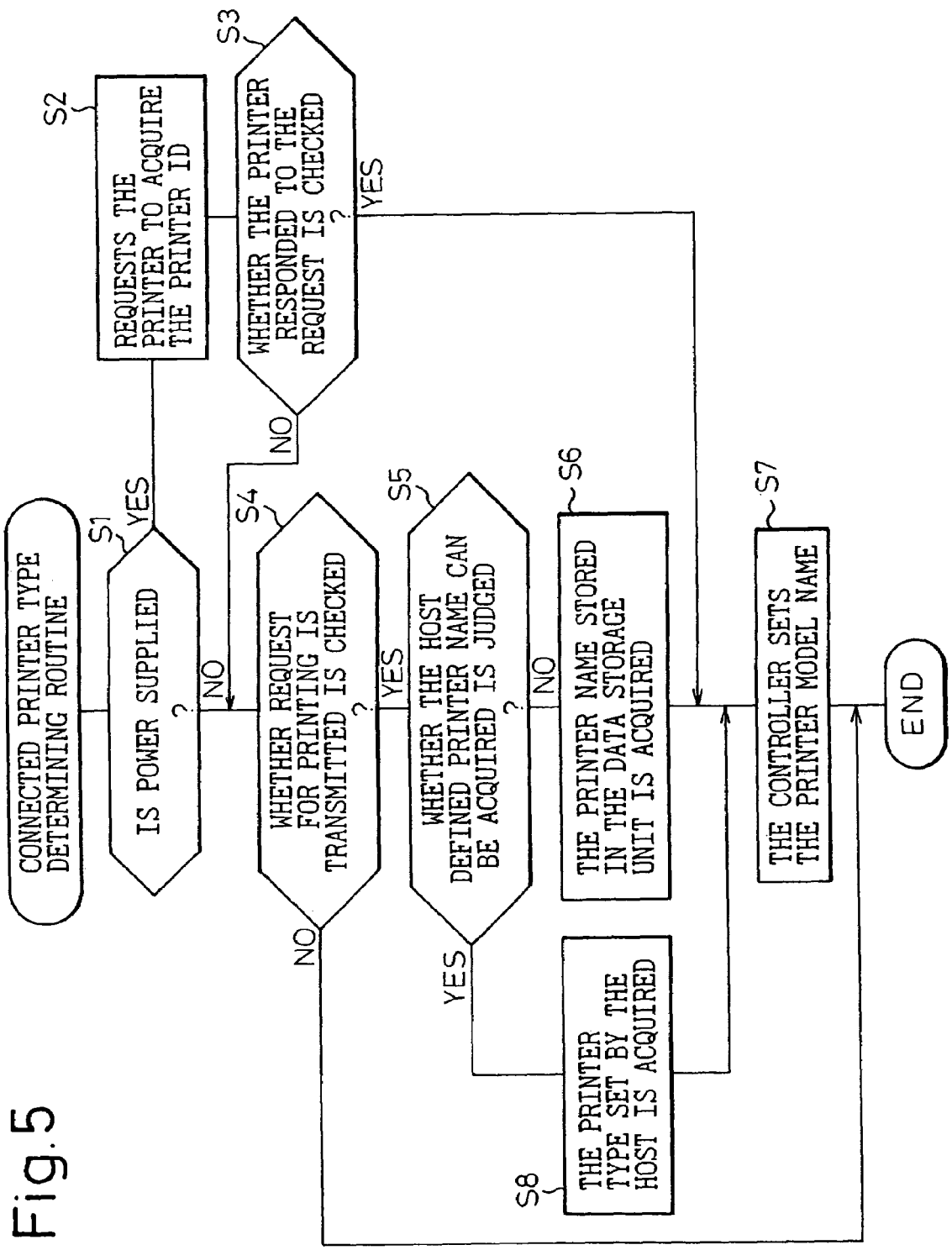

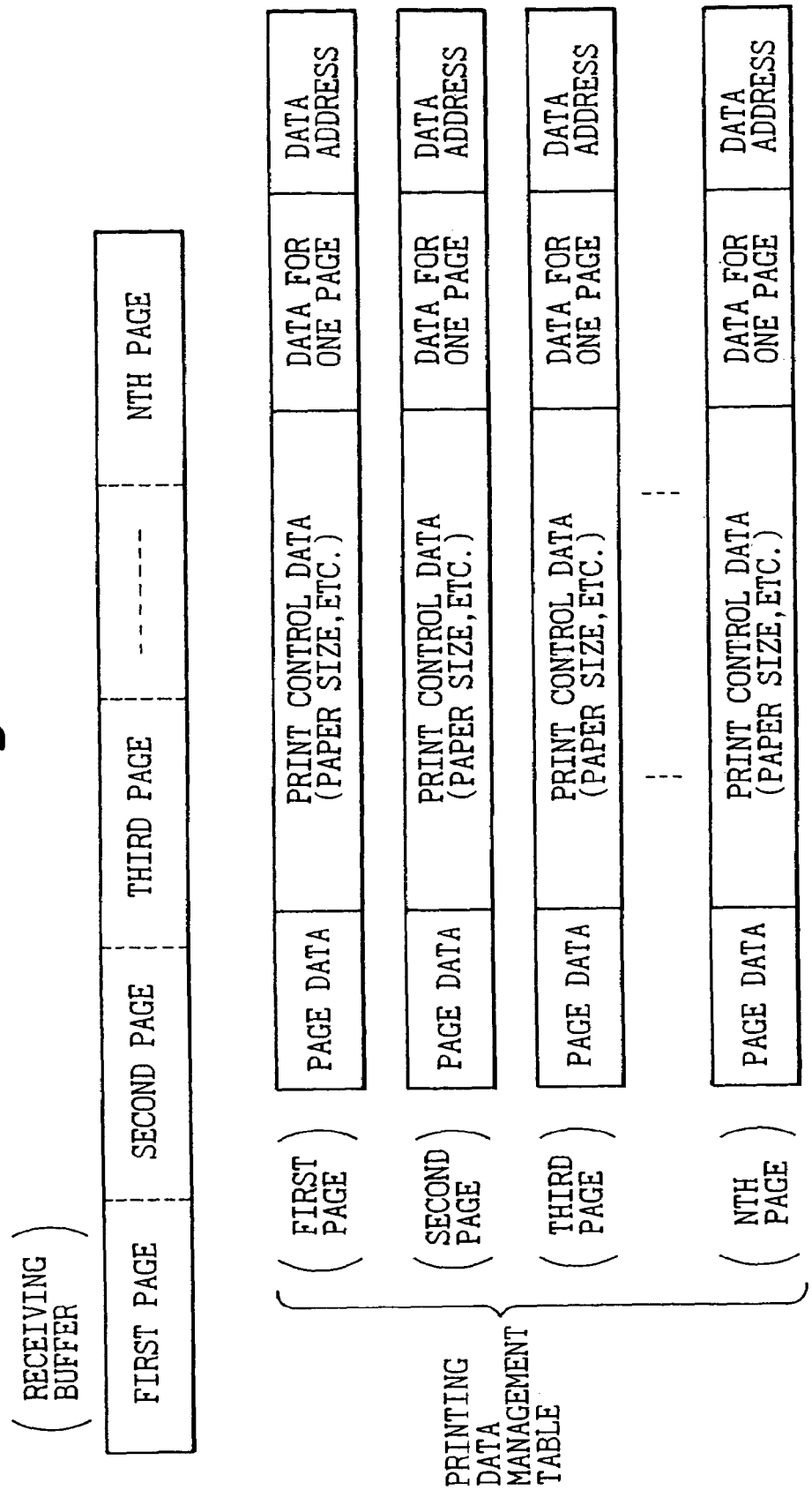

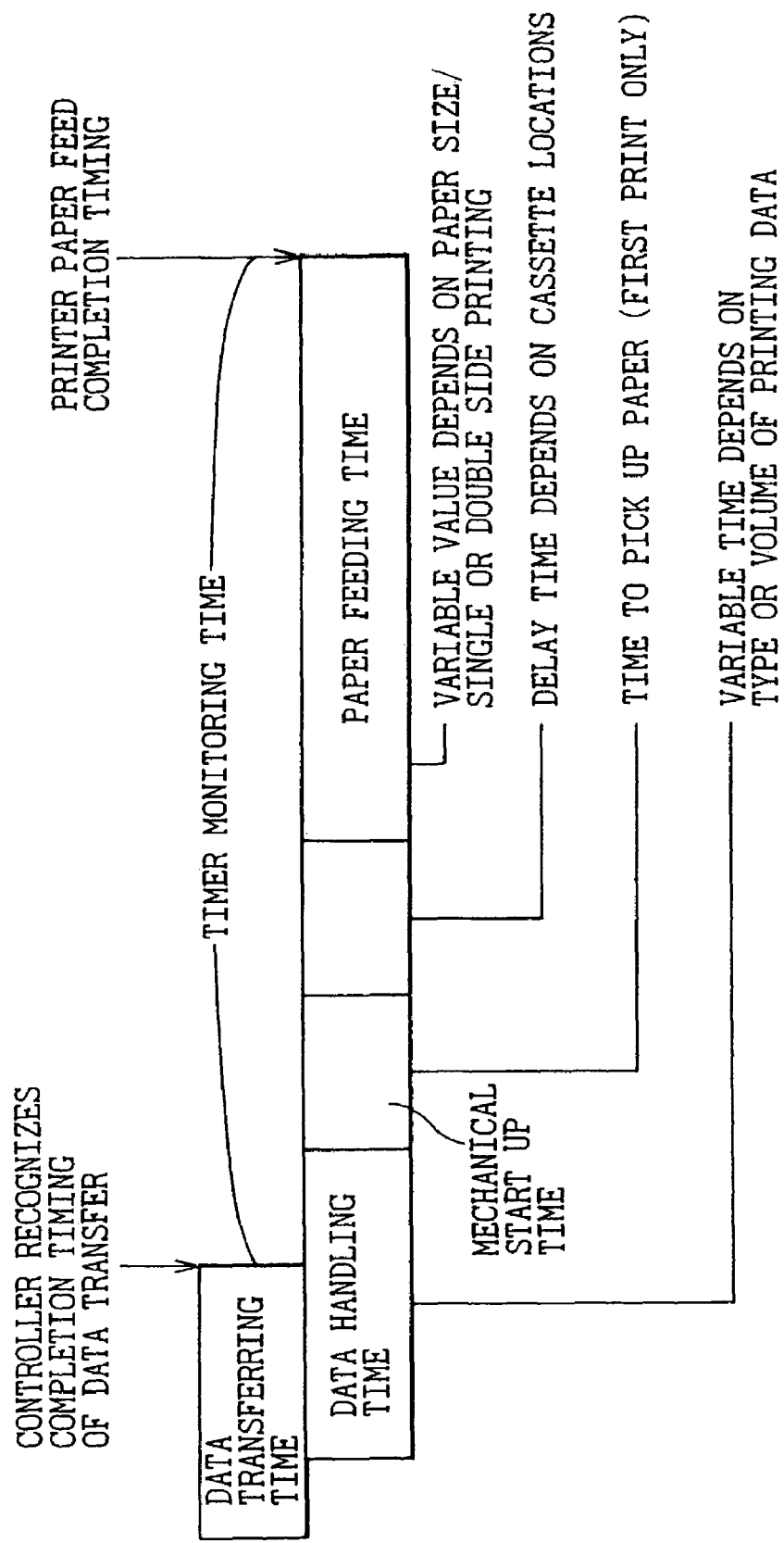

Fig.8A

| | FIRST PRINT DELAY TIME | A3 | A4 | A5 | B4 | B5 | RESERVE |
|---|---|---|---|---|---|---|---|
| MODEL 1 | t1 | t1A | t1B | t1C | t1D | t1E | |
| MODEL 2 | t2 | t2A | t2B | t2C | t2D | t2E | |
| MODEL N | tN | tNA | tNB | tNC | tND | tNE | |
| RESERVE | | | | | | | |

Fig.8B

| | CASSETTE LOCATION 1 | CASSETTE LOCATION 2 | CASSETTE LOCATION 3 | RESERVE |
|---|---|---|---|---|
| MODEL 1 | 0 | t1X | t1Y | |
| MODEL 2 | 0 | t2X | t2Y | |
| MODEL N | 0 | tNX | tNY | |
| RESERVE | | | | |

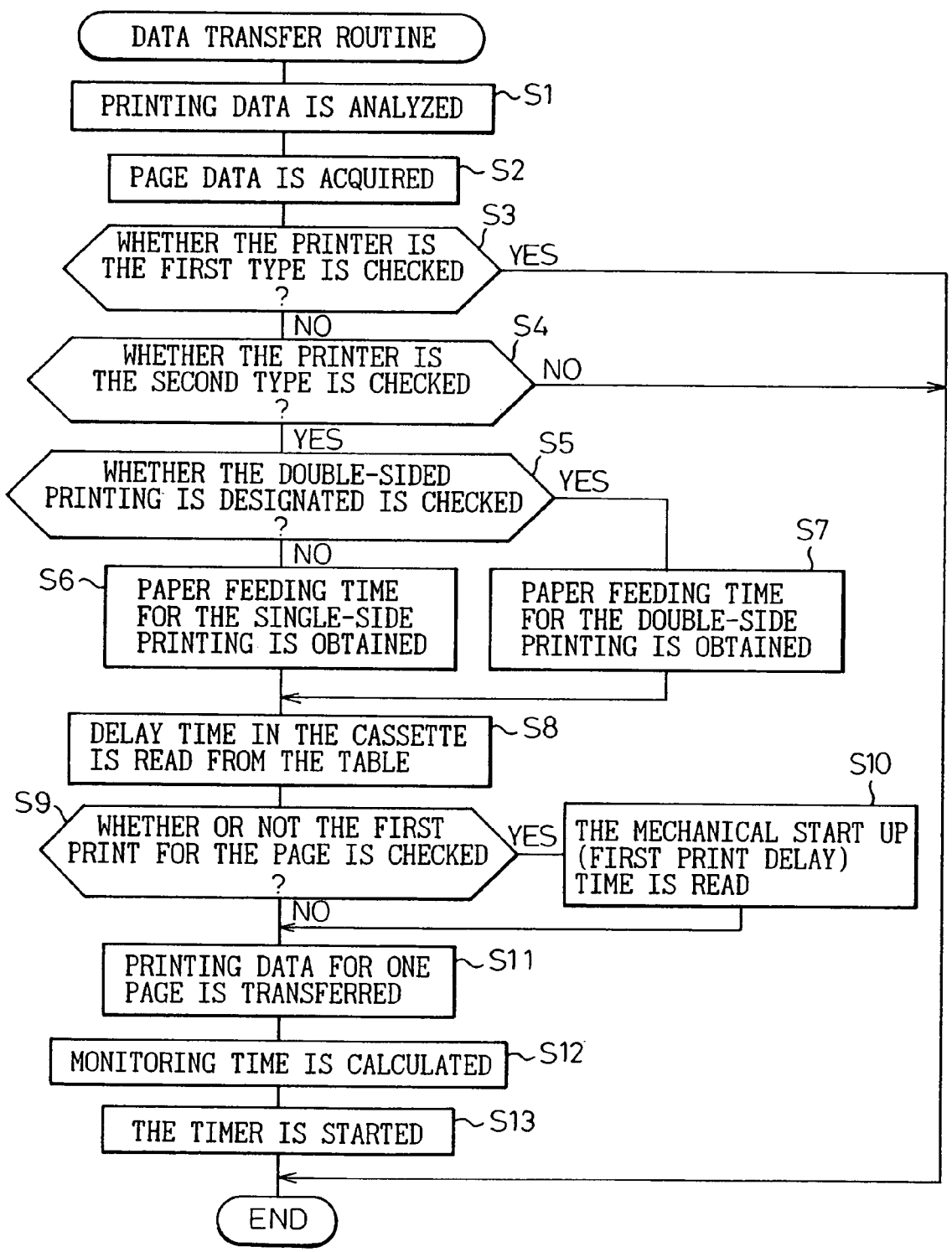

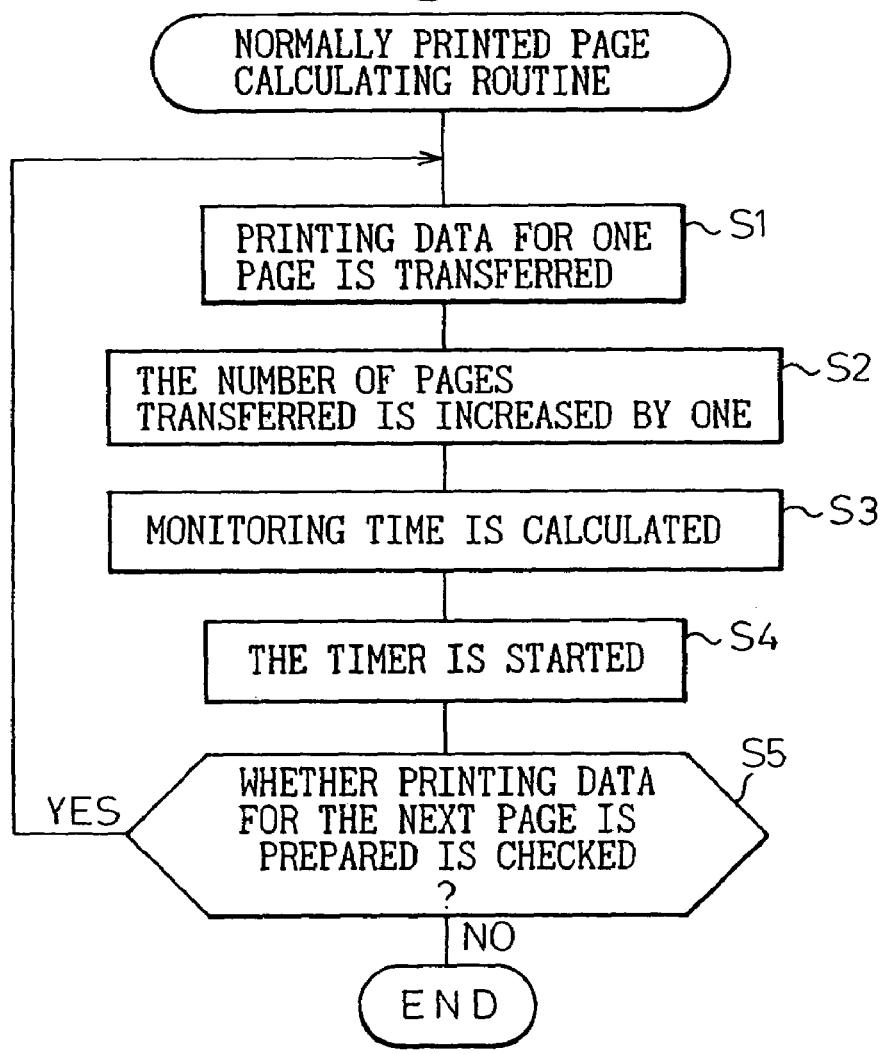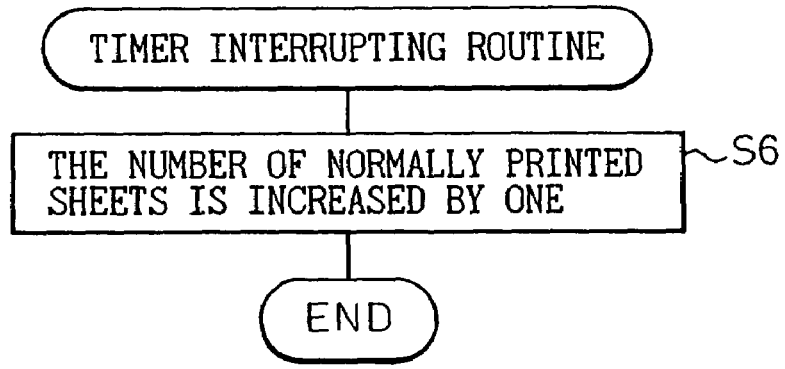

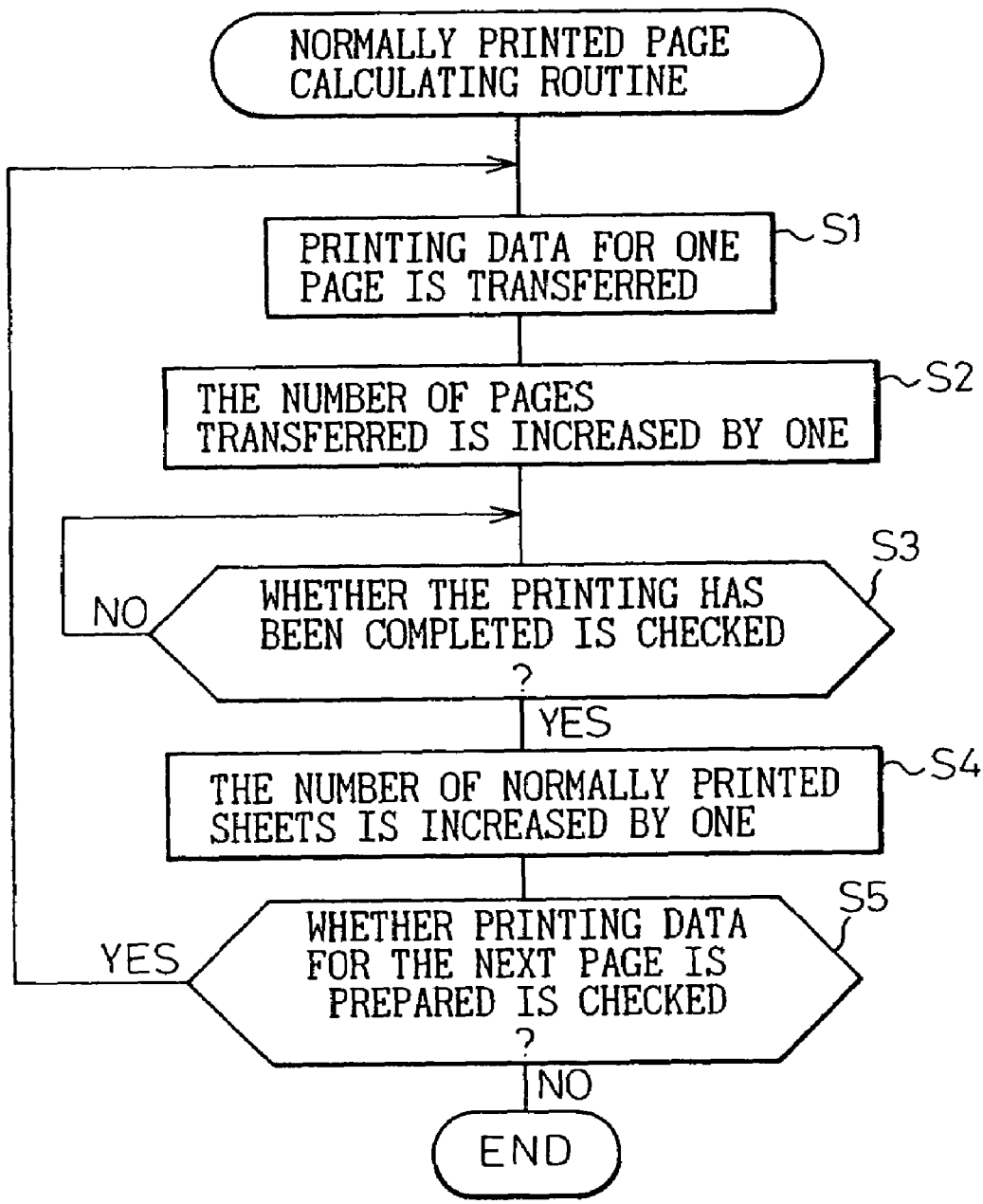

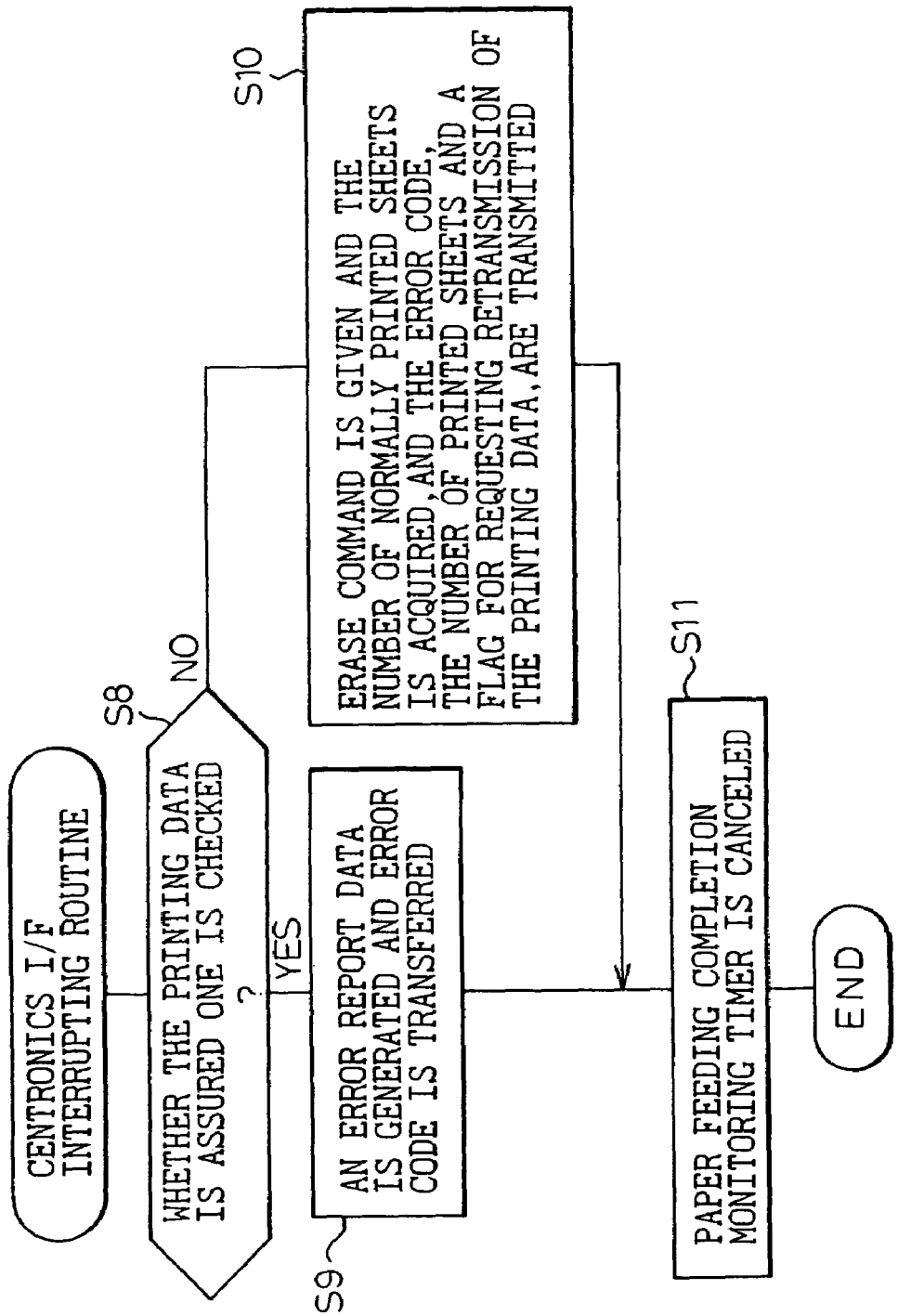

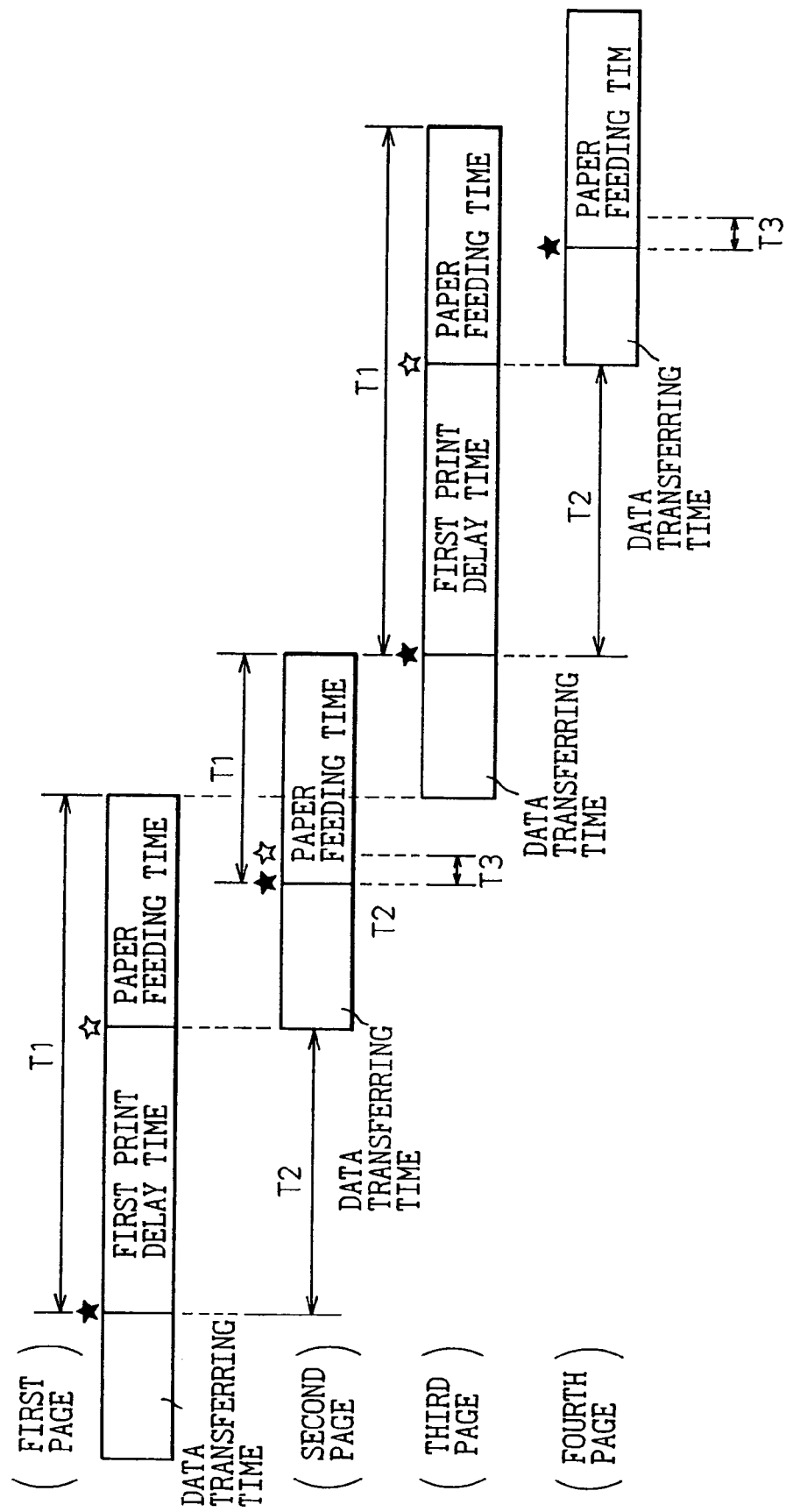

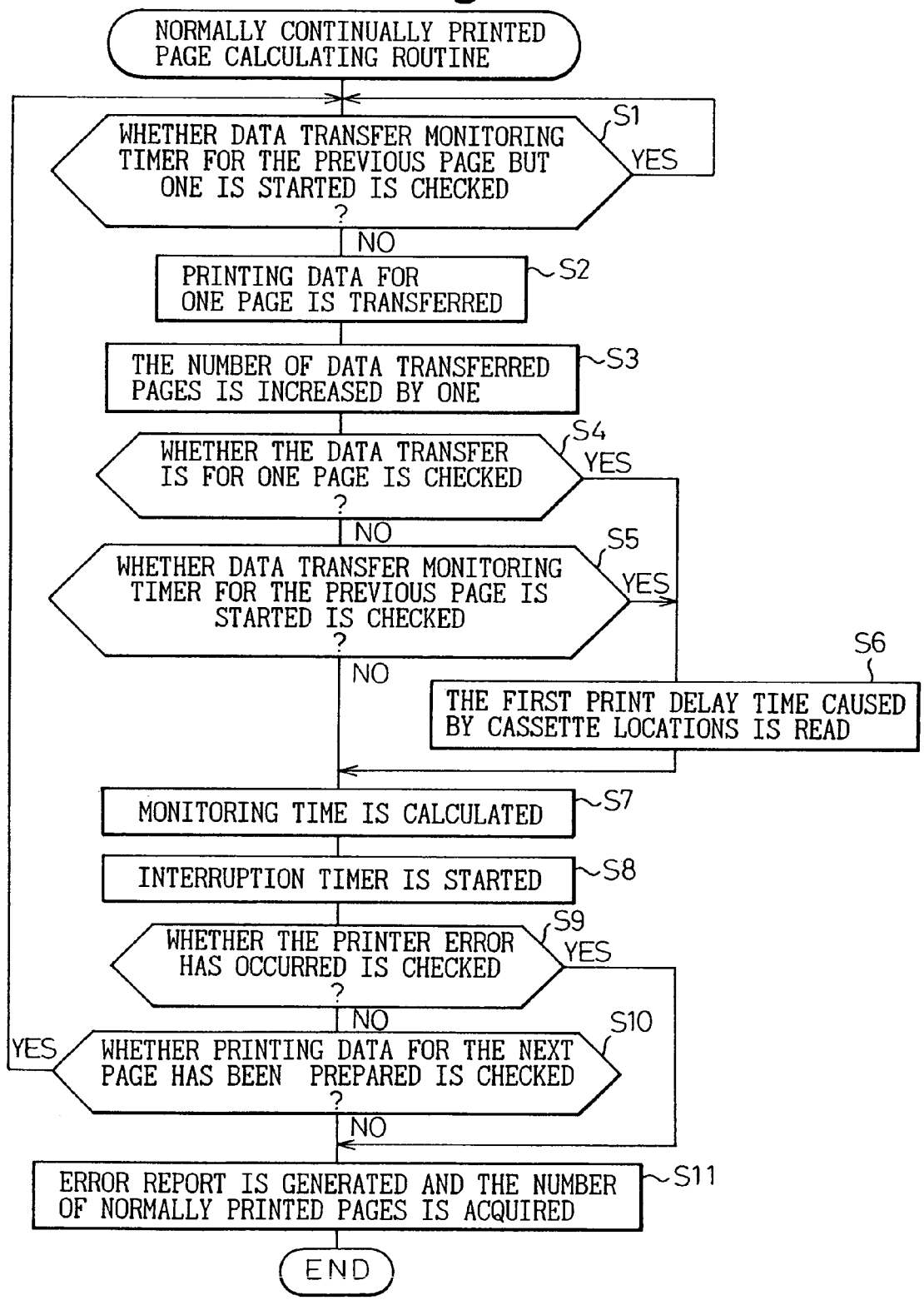

PRINTER CONTROLLER, PRINTING SYSTEM, AND RECORDING MEDIUM THEREFOR

This application is a continuation of U.S. patent application Ser. No. 09/212,393 filed on Dec. 16, 1998, now U.S. Pat. No. 6,967,743, which is incorporated by reference in its entirety.

BACKGROUND OF THE INVENTION

1. Field of the Invention

The present invention relates to a printer controller, a printing system and a recording medium therefor and, in particular, it relates to a printer controller, a printing system and a recording medium which can realize minimum double printing and data assured printing, without deteriorating a performance of the printer, even if a printer incapable of transmitting a print completed signal is used and an error such as a paper jam occurs in the printer.

2. Description of the Related Art

In general, a printer controller is provided between a host which requests printing and a printer. The controller receives printing data transmitted from the host and transfers the data to the printer and controls the printer to print while monitoring the states of the printer.

In the prior art, if a printer incapable of transmitting data containing an error signal and printer state data to the controller or the host is used, when an error such as a paper shortage in a paper-cassette, a paper jam or a power failure has occurred, the controller works as below.

The controller judges whether data can be transferred by checking that power has been supplied to the printer, stops the data transfer when an printer error has been detected during transferring data and resumes the data transfer after the error has been corrected.

When an error in the printer is detected during transferring data, the controller sends a command to initialize the printer and resumes printing for each file.

When assuring the printing data, in other words, when checking whether the printing data is recoverable and not missed, a feed completion wait command, namely, a command for making the printer wait to respond to the data transfer of the next page until the printer completes feeding the printed paper, is added to the printing data.

Printing systems in the prior art pose several problems that cause abnormal printing such as data skip, page skip, character change and the like when an error has occurred in the printer and the printing is resumed after the error has been corrected. For example, (1) When consecutive printing data is transferred after a power supply to the printer is recovered after the power supply turned off during printing, namely, after the printer becomes ready for printing after the power turned off.

(2) When consecutive printing data is transferred after a paper jam has been corrected after the jam occurred during printing.

In addition, when a command for making the printer wait until the printer completes feeding the printed paper is added, data transfer of the next page cannot be started for printing because the printer waits for a response to the transferring data of the next page until the printer completes feeding the printed paper. Thus, such a printing system in prior art as explained above poses a problem in that a decrease in performance in continual printing, as compared with normal printing, occurs because the mechanical performance of the printer cannot be fully utilized.

In order to solve the above problems, a printer controller comprising a storage means for storing printing data and a managing means for managing printed pages with the use of the storage means is disclosed in Japanese Patent Publication No. 2-217281 and No. 9-114618, wherein Japanese Patent Publication No. 2-217281 requires retransmission from a host to the controller while Japanese Patent Publication No. 9-114618 does not require the same for error recovery. According to the technique of these disclosed controllers, the number of printed pages can be managed and error recovery can be accomplished. However, the controllers require a storage means for storing printing data, thus the controllers cannot be made compact or economical.

SUMMARY OF THE INVENTION

Therefore, it is an object of the present invention to solve the above problems and provide a printer controller, a printer system and a recording medium for the same, without providing a storage means for storing printing data, and capable of realizing minimum page skipping and minimum double printing and capable of assuring printing data without deteriorating the performance of the printer when the printing is resumed after an error has been corrected.

A printer controller according to the present invention which solves the above problems, receives printing data for each page from a host, transfers the printing data to a printer and controls the printer to print the printing data while monitoring states thereof.

The printer controller is characterized in that it comprises: an analyzing unit that analyzes the printing data and manages the number of pages transferred to the printer; and an error processing unit that informs error data and the number of pages of which printing has been completed to the host when an error in which data is not assured occurred in the printer.

A printing system according to the present invention comprises a host, a controller and a printer controlled by the controller. The host comprises a function to analyze printing data and a function to manage the printing data for each page. The controller comprises an analyzing unit, an error processing unit, a printer recognizing unit, a set data storage unit, and a data transferring unit.

Each unit in the controller executes the following processes:

(1) The analyzing unit analyzes the printing data transmitted from the host and manages the number of pages transferred to the printer.

(2) The error processing unit monitors the states of the printer and executes a process of error data informed from the printer. For example, when an error in which data is not guaranteed occurs in the printer, the unit informs the error data and the number of pages of which printing has been completed by the time when the error occurred, to the host.

The host transmits printing data of which printing has not yet completed to the controller, and makes it possible to re-print for each file based on the information informed from the controller, after the printer has recovered, by correcting the error.

(3) The preset data storage unit stores preset data of the printer connected to the controller. The analyzing unit and the error processing unit execute the respective processes with the use of the preset data.

(4) The preset data storage unit can also store preset data of the printer informed from the host. The analyzing unit and the error processing unit execute the respective processes in accordance with a function of the printer informed from the host and stored in the preset data storage unit.

(5) The printer recognizing unit recognizes types, functions and the like of the printer connected to the controller by testing the printer. The analyzing unit and the error processing unit execute the respective processes in accordance with the function of the printer stored in the preset data storage unit and recognized by the recognizing unit.

(6) The data transferring unit transfers printing data to the printer.

(7) A plurality of analyzing units may be provided, each corresponding to each type of printer connected to the recognizing unit in the controller which is recognized by the recognizing unit, and one of the analyzing units is selected according to the type.

(8) In case a printer incapable of transmitting a paper feeding completion signal is connected to the controller, the error processing unit estimates the number of pages of which printing has completed based on the mechanical function of the printer and transmits the estimated number of pages with error data to the host.

According to the present invention, which solves the aforementioned problems, a printing system is provided which comprises a host, a controller that receives printing data for each page transmitted from the host and a printer that receives the printing data from the controller and carries out printing while monitoring the states of the printer by the controller, is characterized in that: said controller comprises, an analyzing unit that analyzes the printing data and manages the number of pages transferred to the printer, and an error processing unit that informs error data and the number of pages of which printing has been completed to the host when an error in which data is not assured occurred in the printer, wherein when an error occurs in the printer, said host transmits printing data of which printing has not been completed to the controller based on data informed by the controller after the printer is recovered by correcting the error, said controller transfers said printing data to the printer and controls the printer to carry out re-printing for each page.

According to the present invention which solves the aforementioned problems, a recording medium is provided which is readable by computers on which programs are recorded which enable a computer to proceed the steps of receiving printing data for each page from a host, transferring the printing data to a printer and controlling the printer to print the printing data while monitoring states thereof, is characterized in that: said programs enable said computer to function as an analyzing unit that analyzes the printing data and manages the number of pages transferred to the printer; and an error processing unit that informs error data and the number of pages of which printing have been completed to the host when an error in which data is not assured occurred in the printer.

BRIEF DESCRIPTION OF THE DRAWINGS

The present invention will be more clearly understood from the description as set forth below with reference to the accompanying drawings, wherein:

FIG. 4 is a view showing a format of a printing data stream transmitted from the controller to the host, both shown in FIG. 1;

FIG. 5 is a flowchart showing a routine for setting a type of a printer connected to the controller, both shown in FIG. 1;

FIG. 6 is a view showing a printing data management table;

FIG. 7 is a view for explaining details of printing time assigned to a page printer;

FIG. 8A is a view showing an example of a parameter table related to paper sizes for various kinds of printers;

FIG. 8B is a view showing another example of a parameter table related to cassette locations for various kinds of printers;

FIG. 9 is a flowchart showing a routine for data transfer from the controller to the printer, both shown in FIG. 1;

FIG. 10A is a flowchart (in a normal condition) showing a routine for counting the number of normally printed sheets by a controller to which a second type printer having no function of informing the print completion signal, is connected;

FIG. 10B is a flowchart showing a timer interrupting routine related to FIG. 10A;

FIG. 10C is a flowchart (in a normal condition) showing a routine for counting the number of normally printed sheets by a controller to which a first type printer, having a function of informing the print completion signal, is connected;

FIG. 11B is a flowchart showing a timer interrupting routine related to FIG. 11A;

FIG. 14 is another example of a timechart showing a data transfer from a controller to a page printer when a plurality of pages are continuously printed;

FIG. 15A is a flowchart showing a routine for counting the number of normally printed sheets by a page printer when a plurality of pages are continuously printed.

DESCRIPTION OF THE PREFERRED EMBODIMENTS

The preferred embodiments of the present invention will be described below with reference to the accompanying drawings.

Figure 1:
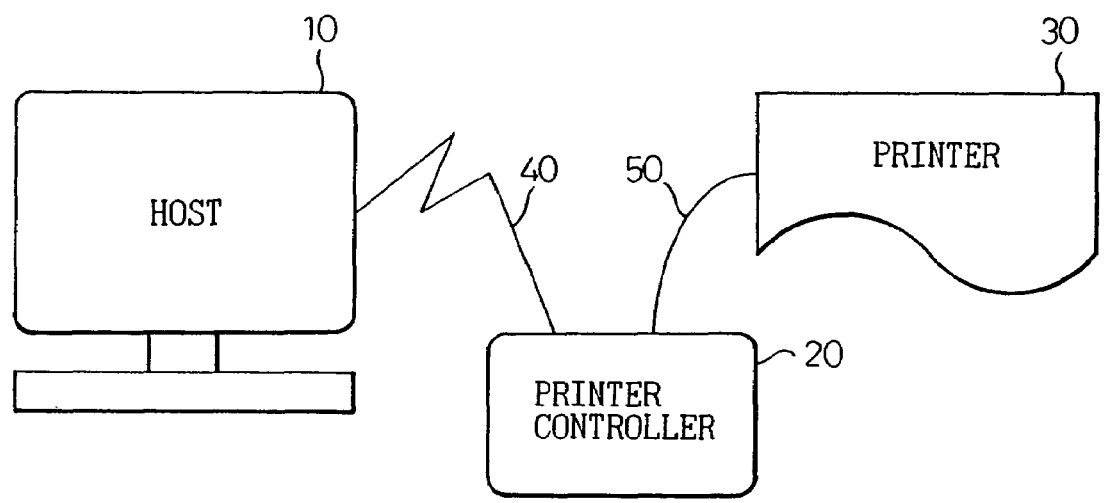
FIG. 1 is a general constitutional view showing a printing system of an embodiment of the present invention.

FIG. 1 is a general constitutional view showing a printing system of an embodiment of the present invention. In FIG. 1, 10 denotes a host that requests printing, 20 denotes a controller and 30 denotes a printer. The host 10 and the controller 20 are connected via a Local Area Network (LAN) 40. The controller 20 and the printer 30 are connected with a cable 50 in accordance with the Centronics interface (I/F). A plurality of hosts 10 can be connected to the controller 20 via the LAN 40.

The host 10 comprises functions to analyze the printing data and to manage printed data for each page. The host 10 transmits printing data of which printing has not yet been completed to the controller 20 and makes the controller 20 resume the recovery printing in which the printing data to be transmitted from the host 10 is determined based on an error data informed from the printer 30 via the controller 20, or an error data detected by the controller 20 and informed to the host 10 although the printer 30 is incapable of transmitting the error data, and the number of normally printed pages by the printer 30 which is calculated by the controller 20.

When printing is requested from the host 10, the controller 20 receives the printing data, analyzes data and transfers the data to the printer 30 for printing.

When an error such as a paper jam has occurred in the printer, the controller recognizes the error data of the printer at that time which indicates the number of print completed pages and etc., calculates the number of pages of which printing have completed, and informs the same to the host 10. After the error of the printer 30 is removed, the controller 20 informs to the host 10 that the error is corrected. Then, the host 10 resumes printing for each page for the uncompleted pages.

Figure 2:
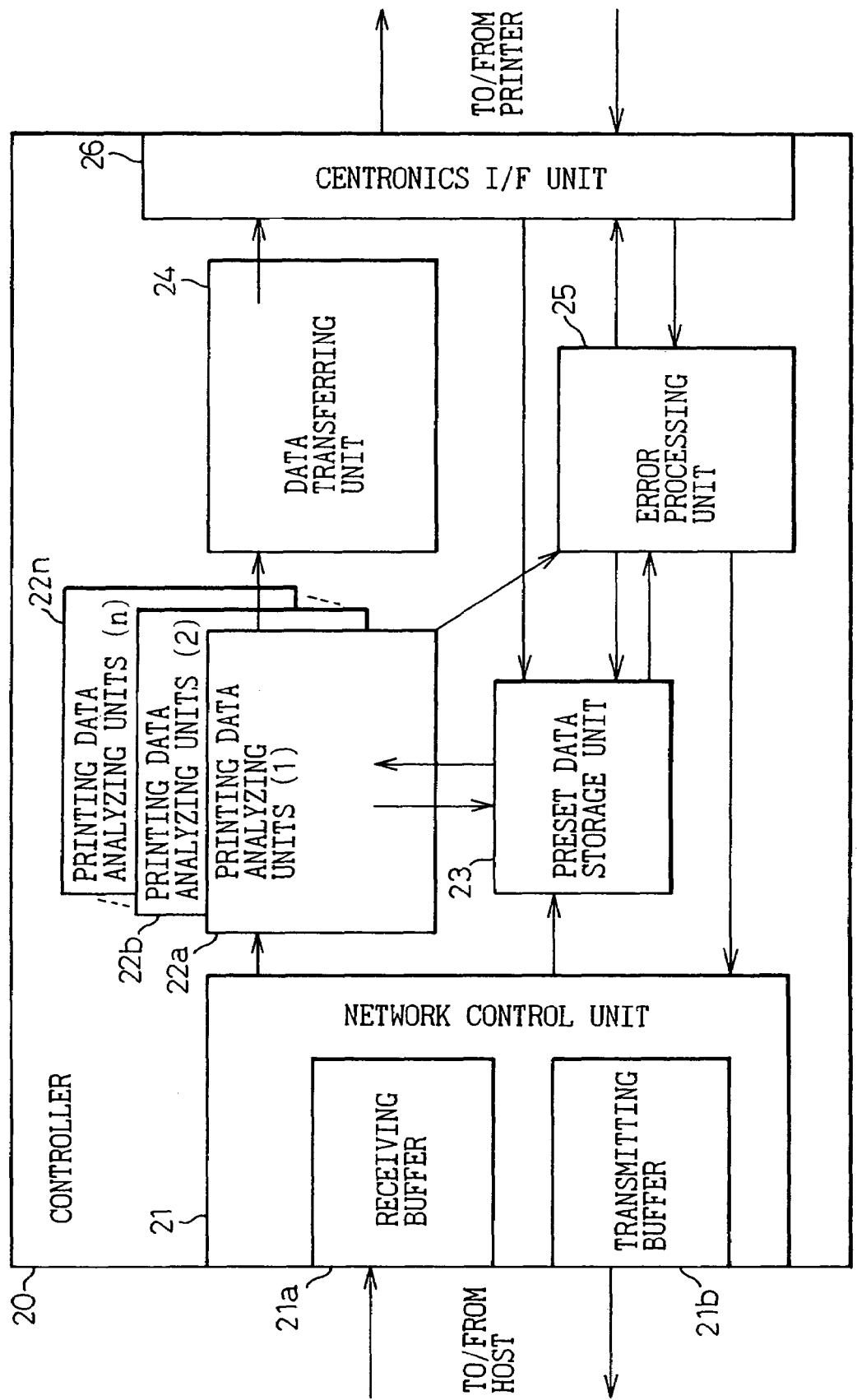
FIG. 2 is a view for explaining a constitution of the controller shown in FIG. 1.

FIG. 2 is a view for explaining a constitution of the controller shown in FIG. 1.

The controller 20 comprises a network control unit 21, a plurality of printing data analyzing units 22-i (i=1 to N), a preset data storage unit 23, a data transferring unit 24, an error processing unit 25 and a Centronics I/F unit 26.

The network control unit 21 comprises a receiving buffer 21a and a transmitting buffer 21b, thereby receiving data transmitted from the host 10 and transferring the data to the analyzing unit 22, and transmitting error data and/or print completion signal to the host 10.

The printing data analyzing unit 22 consists of a plurality of printing data analyzing units 22-1 to 22-N, each adapted to each different kind of printer so that a plurality of data types such as languages supported by the printers can be handled. A printing data analyzing unit 22-i (i=1 to n) adapted to a language supported by the printer 30 is selected based on the model name of the printer 30 obtained from the printer 30 or the printing data.

When the controller 20 receives printing data transmitted from the host 10, the data is passed to the printing data analyzing unit 22-i, and the unit 22-i analyzes the data. By this analysis, the page end, namely, data amount per page, size of printing papers, currently used cassette location when a paper feeding unit consisting of a plurality of cassettes for stocking printing papers is used, and printing control data indicating, for example, whether or not double-sided printing is requested, are obtained.

The data transferring unit 24 determines interval of the data transfer for each page based on the printing control data obtained by the analyzing units 22-i and the model name of the printer 30 connected to the controller 20.

The Centronics I/F unit 26 transfers printing data to the printer 30 and recognizes a state of the printer 30 and acquires a nibble mode of the IEEE-1284 interface and the device ID (identification) number. In case printers in which the nibble mode is supported are connected to the controller, detail error data and the number of print completed pages can also be acquired.

The error processing unit 25 converts error data acquired via the Centronics I/F unit 26 from the printer 30 to an error code for transmitting it to the host 10 via the transmitting buffer 21B. The error processing unit 25 also judges whether the error data transferred from the printer is assured or not. The assured error data herein means printing data which does not require retransmission from the host 10 because the printing data is recoverable and not missed, while non-assured error data means printing data which need retransmission from the host 10.

In case the error is not an assured one, the error processing unit 25 commands the printer 30 to erase printing data and calculates and obtains the number of normally printed pages, and transmits the error code, the number of normally printed pages and a flag indicating that the printing data is not assured (guaranteed), to the host 10 via the transmitting buffer 21b.

When the host 10 receives the number of normally printed pages and the flag indicating that the printing data is not assured, the host retransmits the uncompleted printing data to the printer 30 via the controller 20.

After setting a network environment setting, for example, an IP address setting from the host 10, has completed in accordance with the TELENET protocol supported by the controller, a model name and the function level settings of the printer 30, and customizing data settings which can be set by users, the preset data storage unit 23 stores the above set data into a non-volatile memory such as EEPROM.

Figure 3:
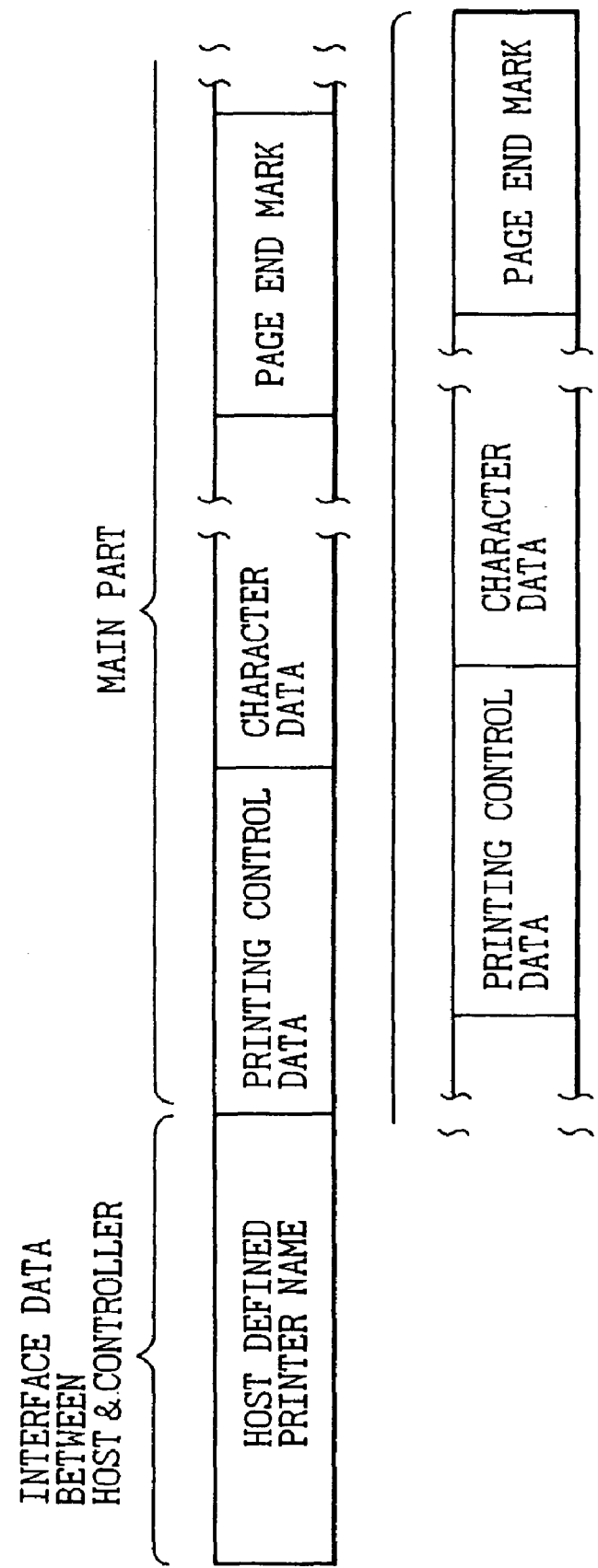
FIG. 3 is a view showing a format of a printing data stream transmitted from the host to the controller, both shown in FIG. 1.

FIG. 3 is a view showing a typical format of a printing data stream transmitted from the host 10 to the controller 20, both shown in FIG. 1.

Data assigned as interface data between the host 10 and the controller 20 in a network as shown in FIG. 3, which is data for a proper protocol used for communication between the host 10 and the controller 20, and is necessary data for the host 10, like "host defined printer name" or the like, is set.

In the main part, printing data to be actually transferred to the printer 30 are assigned in such a format as "printing control data such as a paper size and a cassette location", "character data to be printed" and so on in series for each page. As shown in FIG. 3, "a page end mark" is attached to each end of the printing data for each page.

FIG. 4 is a view showing a typical format of a printing data stream transmitted from the controller 20 to the host 10, both shown in FIG. 1. As shown in FIG. 4, the format includes a "header", an "error code" indicating error data in a printer, "the number of printed pages" indicating the number of normal print completed pages and a "flag" indicating whether the error in the printer 30 is recoverable or requires retransmission of the printing data.

When an error requiring retransmission of the printing data occurs in the printer 30, the number of normal print completed pages is set in the part of "the number of printed pages" and "1" is set in the "flag" indicating that retransmission of the printing data is required, then the data stream is transmitted to the host 10.

FIG. 5 is a flowchart showing a routine for setting a type of a printer connected to a controller.

In steps S1, the controller 20 judges whether or not the power is supplied to the printer 30. If the result in step S1 is YES, the controller 20 sends a request command to the printer 30 in order to acquire the device ID of the printer in step S2. In step S3, whether or not the printer 30 has responded to the request command in step S2 is checked. If the result in step S3 is YES, the controller 20 sets the model name of the printer 30 in accordance with the device ID reported by the printer 30 in step S7.

In case the printer 30 does not respond to the request command in step S3, it can be judged that the printer is not the type which conforms to the IEEE-1284 I/F so that the process proceeds steps S4 to S8 to acquire the type of the printer. In step S4, the controller 20 judges whether or not a request for printing is transmitted from the host 10, if the result is YES, step S5 proceeds, and if the result is NO, the routine ends. In step S5, it is judged whether or not the host defined printer name set in accordance with the interface data between the host 10 and the controller 20 in printing data in response to the print command, as explained with reference to FIG. 3, can be acquired, namely, it is judged whether or not the printer model name set by the host can be acquired. If the result is YES, step S8 proceeds to acquire the printer type set by the host. If the result is NO, step S6 proceeds to acquire the printer name stored in the preset data storage unit 23.

In addition to the routine explained above, if a printer name acquired from the host 10 different from a printer name acquired from the printer 30, the controller 20 passes a setting error to the host 10.

If a host incapable of setting the host defined printer name is used, since the value is not set in the field of the host defined printer name in the printing data, a device model name stored in the preset data storage unit 23 is used.

After the printer name is determined by executing the routine explained above, the analyzing unit 22 takes out the printing data received via the communication line out of the receiving buffer, and analyzes the printing data based on the determined type of the printer and manages the data for each page.

FIG. 6 is a view showing a printing data management table. The printing data analyzing unit 22 generates the table in which each printing data is assigned for each page as shown in FIG. 6 after the printing data from the host 10 is received in the buffer 21b. Then the data divided into pages and managed by the analyzing unit 22 are passed to the data transfer controller 24, and the data are transferred to the printer 30 via the Centronics I/F controller 26.

The calculating unit for calculating the number of print completed pages executes different routines depending upon the three different types of the printers as described below.

(First Type): Printers capable of informing the number of normal print completed pages in accordance with the nibble mode of IEEE-1284.

(Second Type): Printers such as a laser beam page printer incapable of informing the number of normal print completed pages in accordance with the nibble mode of IEEE-1284.

(Third Type): Printers such as line printers, serial printers and multi-purpose printers, incapable of informing the number of normal print completed pages in accordance with the nibble mode of IEEE-1284.

In the first type of printers, the number of normal paper feeding completion pages can be acquired by checking data from the printer when the error is informed from the printer.

In the third type printers such as a line printer having only a line buffer, normal paper feeding completion can be acquired by confirming the completion of transferring data indicating page end because the printer has only the line buffer for the temporarily storing printing data for a few lines.

On the other hand, in case of the second type of printers such as a page printer, even if page end data is transferred, it is not always the case that the page has completely printed since printing data for a plurality of pages can be buffered in the printer. Because of this, the controller monitors printing time and estimates the completion time of normal printing. Namely, as the printer does not inform the print completion, the controller presets an imaginary time for paper feeding completion and regards that the normal printing has completed when the error has not been informed from the printer for a period of the preset time.

FIG. 7 is a view for explaining details of printing time assigned to the second type of printers, for example, page printers.

In case of the second type of printers, the printing speed, the number of pages printed per minute (ppm) of each printer is known as a mechanical performance. As apparent from FIG. 7, the timer monitoring time corresponding to the imaginary time for paper feeding completion can be given by the following equation.

$$\text{(The timer monitoring time)} = \quad (1)$$
$$\text{(data handling time)} + \text{(mechanical start up time)} +$$
$$\text{(delay time caused by the cassette)} + \text{(paper feeding time)}$$

wherein the data handling time is a period started from the completion timing of the data transfer from the printer controller 20 to the printer 30 and is handled by the printer, the data handling time is set to "0" except for particular data types, and the mechanical start up time is set to "0" except for the first printing page.

FIG. 8A is a view showing an example of a parameter table to obtain respective mechanical start up time and paper feeding time related to paper sizes for various kinds of printers, and FIG. 8B is a view showing another example of a parameter table to obtain respective delay time related to cassette locations for various kinds of printers. In these tables, measured values or calculated values are preset. The timer monitoring time can be given by the following equation, $$\text{(The timer monitoring time)} = \text{(mechanical start up time)} + \quad (2)$$
$$\text{(delay time in the cassette)} + \text{(paper feeding time)}$$

As an example, assuming that the printer type, MODEL 1, is connected to the printer controller 20, paper size A4 is used, and one page is printed by using papers stocked in the No. 2 cassette, the timer monitoring time is given by (t1+t1X+t1B).

FIG. 9 is a flowchart showing a routine for data transfer from a controller to a printer.

First, in step S1, printing data is analyzed in the printing data analyzing unit 22. In step S2, the page data is acquired. Next, in step S3, whether or not the printer 30 connected to the printer controller 20 is the first type is checked. If the result is YES, namely, if the printer 30 is the first type, the routine ends. If the result is NO, the process proceeds to step S4. In step S4, whether or not the printer 30 is the second type such as a page printer is checked. If the result is YES, namely, if the printer 30 is the second type, the process proceeds to step S5. If the result is NO, namely, if the printer is the third type, the routine ends.

If the printer 30 is the second type, for example, a page printer, whether or not the double-sided printing is designated or not is checked in step S5. If the result is NO, the paper feeding time for the single-side printing is obtained with reference to the table as shown in FIG. 8A in step S6. If the result is YES, the paper feeding time is obtained with reference to a similar table to that shown in FIG. 8A in which paper feeding time for the double-sided printing is preset in step S7.

Next, in step S8, the delay time in the cassette is read from the table as shown in FIG. 8B. In step S9, whether or not the first print for the page is checked. If the result is YES, the process proceeds to step S10. In step S10, the mechanical start up time is read from the table as shown in FIG. 8A. If the result is NO, the process proceeds to step S11. In step S11, the data transfer unit 24 transfers printing data for a page to the printer 30 via the Centronics I/F unit 26. In step S12, the timer monitoring time is calculated based on the equation explained before. In step S13, the timer is started to complete the process.

FIGS. 10A, 10B, 10C, 11A, 11B, 12A and 12B are flowcharts showing a routine for counting the number of normally printed sheets in a normal condition executed by the controller 20 according to an embodiment of the present invention.

FIG. 10A is a flowchart showing a first routine for counting the number of normally printed sheets in a normal condition when the second type printer is connected to the controller, and FIG. 10B is a flowchart showing a timer interrupting routine triggered by the first routine.

In FIG. 10A, in step S1, the print data analyzing unit 22 transfers the printing data for each page from the data transfer unit 24 to the printer 30 via the Centronics I/F controller 26 in which the printing data is transmitted from the host 10 and received by the network control unit 21. In step S2, the analyzing unit 22 increases the number of pages transferred as the printing data by one. The process calculates the monitoring timer as explained before in step S3, and sets the timer for the interrupting routine in step S4.

When the monitoring time has passed while the printer 30 did not generate any error, the timer interruption routine shown in FIG. 10B, is started. In step S6, the number of normally printed sheets is increased by one.

In step S5, whether or not printing data for the next page is prepared is checked, if the result is YES, the process returns to step S1 and repeats steps S1 to S5. If the result is NO, the process ends.

FIG. 10C is a flowchart showing a second routine for counting the number of normally printed sheets in normal condition when the first type printer is connected to the controller.

In FIG. 10C, steps S1, S2 and S5 are the same as those in FIG. 10A. Thus, the explanation is omitted and only steps S3 and S4 will be explained below. In step S3, whether or not the printing has been completed is checked, if the result is YES, the process proceeds to step S4, if the result is NO, the process returns to step S3. In step S4, the number of normally printed sheets is increased by one.

Figure 11A:
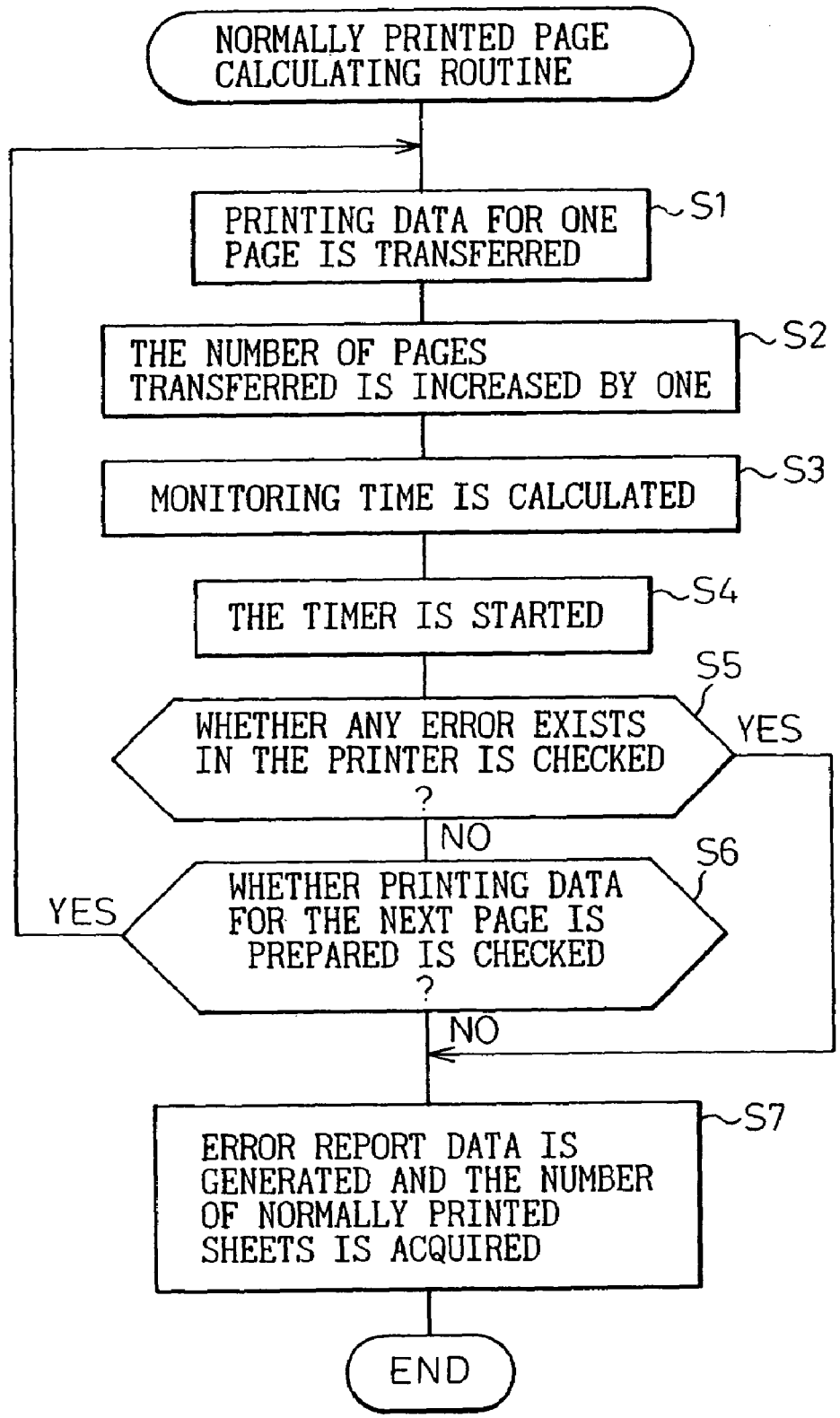
FIG. 11A is a flowchart (when an error has occurred) showing a routine for counting the number of normally printed sheets by a controller.

FIG. 11A is a flowchart showing a third routine for counting the number of normally printed sheets in case an error has occurred, and FIG. 11B is a flowchart showing a timer interrupting routine triggered by the third routine.

In FIG. 11A, steps S1, S2, S3 and S4 are the same as those in FIG. 10A. Thus, the only steps S5 to S11 will be explained below. In step S5, whether or not the monitoring time has passed without receiving any error from the printer 30 is checked. If the result is YES, the process proceeds to step S7, if the result is NO, the process proceeds to step S6. In step S6, whether or not printing data for the next page is prepared is checked. If the result is YES, the process returns to step S1 and steps S1 to S6 are repeated. If the result is NO, the process proceeds to step S7. In step S7, an error report data is generated and the number of normally printed sheets is acquired.

If the Centronics interface interruption is triggered by an error in the printer before the monitoring time has passed, the timer interruption routine as shown in FIG. 11B, is started.

In step S8, the error processing unit 25 checks whether or not the printing data is assured, if the result is YES, step S9 proceeds. If the result is NO, step S10 proceeds. In step S9, an error report data in an error code is generated, and transmits the error code to the host 10. In step S10, a command to erase the printing data is given to the printer 30, the number of normally printed sheets is acquired, and the above number of normally printed sheets and a flag indicating a command for request to retransmit the printing data, are transmitted to the host 10, along with the error code. In step S11, a paper feeding completion monitoring timer is canceled, if the timer is set.

Figure 12A:
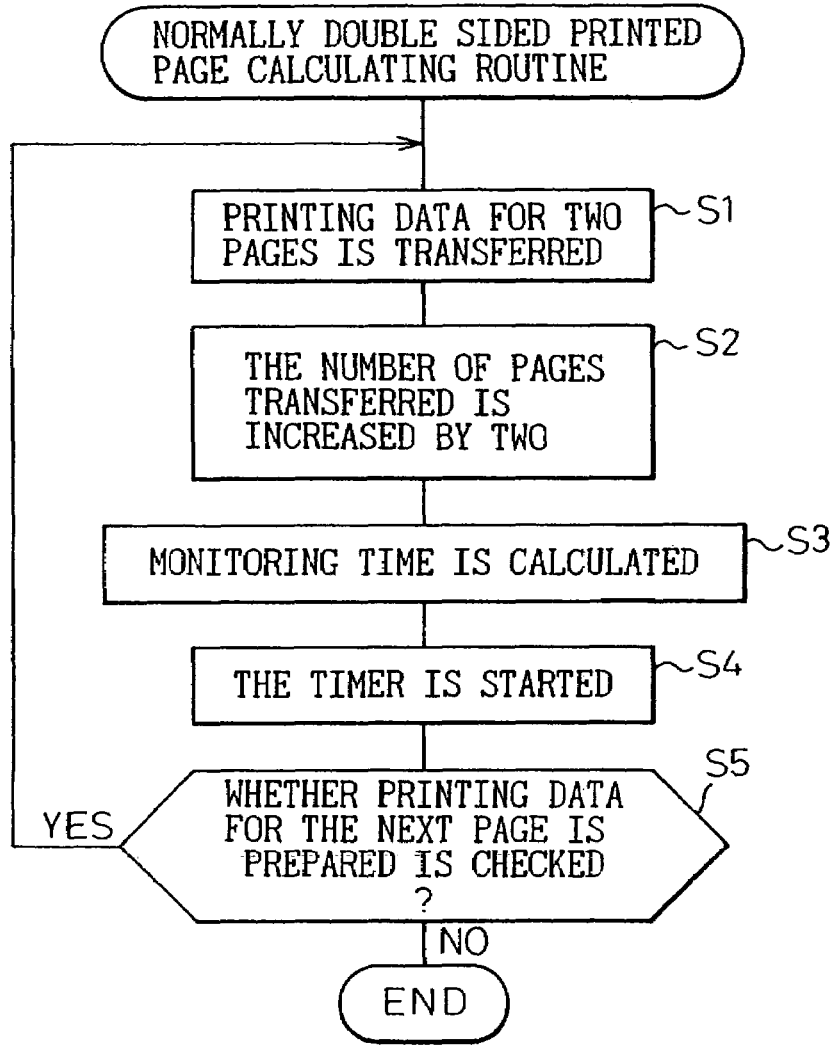
FIG. 12A is a flowchart (when double-sided printing is executed) showing a routine for counting the number of normally printed sheets by a controller.
Figure 12B:
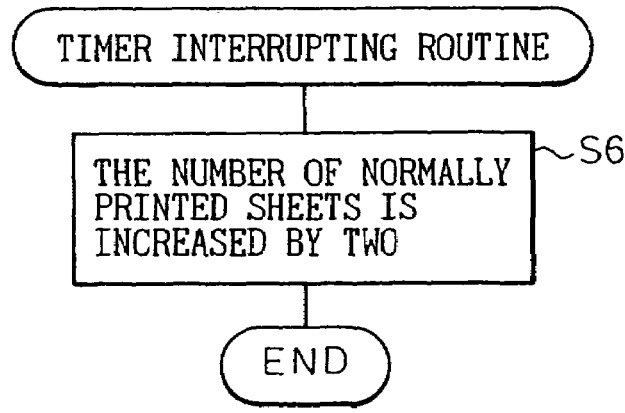
FIG. 12B is a flowchart showing a timer interrupting routine related to FIG. 12A.

FIG. 12A is a flowchart showing a fourth routine for counting the number of normally printed sheets in normal condition and double-sided printing is selected when the second type printer is connected, and FIG. 12B is a flowchart showing a timer interrupting routine triggered by the fourth routine.

In FIG. 12A, in step S1, the print data analyzing unit 22 transfers the printing data for each two pages from the data transfer unit 24 to the printer 30 via the Centronics I/F controller 26 in which the printing data is transmitted from the host 10 and received by the network control unit 21. In step S2, the analyzing unit 22 increase the number of pages transferred as the printing data by two. The process calculates the monitoring timer in step S3, and sets a timer for interruption in step S4, as explained before.

When the monitoring time has passed without receiving any error from the printer 30, the timer interruption routine shown in FIG. 12B, is started. In step S6, the number of normally printed sheets is increased by two.

In step S5, whether or not printing data for the next page is prepared is checked, if the result is YES, the process returns to step S1 and steps S1 to S5 are repeated, if the result is NO, the process ends.

As explained above, when the double-sided printing is executed, the number of normally printed sheets is monitored for each two pages, in which a first page for one side of a sheet, a second page for the other side of the sheet. Thus, the number of normally printed pages reported to the host 10 is always even.

Figure 13:
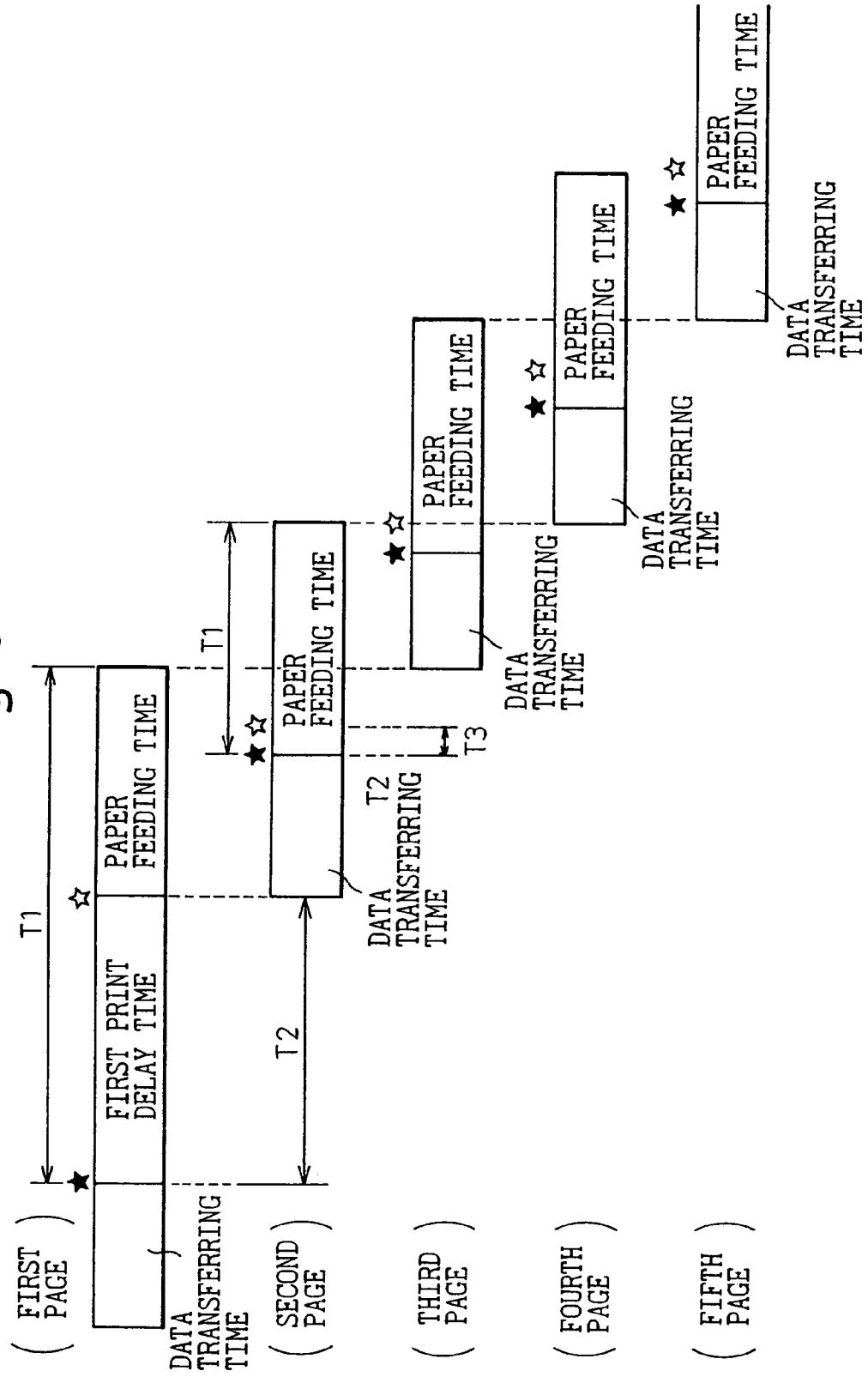
FIG. 13 is an example of a timechart showing a data transfer from a controller to a page printer when a plurality of pages are continuously printed.

FIG. 13 is an example of a timechart showing a data transfer from a controller to a page printer when a plurality of pages are continuously printed, and FIG. 14 is another example for the same.

In FIGS. 13 and 14, black star marks indicate transfer end timing and white star marks indicate paper pick-up timing, wherein the paper pick-up means a motion to bring a sheet of paper to the position to start printing after picking up the paper from a cassette in which printing papers are stocked. In FIGS. 13 and 14, T1 indicates a period from the transfer end timing to the paper feed end timing which is monitored by the paper feeding completion monitoring timer, and T2 indicates a period from the start timing of paper feeding to the paper pick-up timing which is monitored by the next page data transfer start monitoring timer.

FIG. 13 shows an example of the timechart in which the paper feeding of the previous paper has not yet completed when a data transfer from a controller to a page printer has completed. In FIG. 13, the timer for counting T1 time and the timer for counting T2 time start counting when the data transfer for one page to the printer has completed. Note that T2 in the first page printing is longer by the delay time of the cassette as compared with T3 for paper pick-up in the second page printing in the continuous printings.

The data transfer for the second page starts just after the pick-up for the first page has completed. Just after the data transfer for the second page has completed, the T2 timer starts counting. After the third page, the data transfer starts if the paper feeding for previous page but one has been completed after the paper pick up has completed.

In this way, data transfer starts with the completion of the paper feeding for the previous page but one. Thus, the printer can avoid over flow of the buffer and can avoid miscapture of the error data when an error occurred in the printer. Furthermore, the number of errors in calculating the number of printed pages of which paper feeding has completed, can be reduced.

FIG. 14 shows an example of the timechart in which the paper feeding of the previous paper has completed when a data transfer from a controller to a page printer has completed. As shown in FIG. 14, when the paper feeding for the previous page has been completed as shown in the third page printing, when the data transfer has just completed, the paper feeding completion monitoring timer T1 indicating a period from the transfer end timing to the paper feed end timing and the next page data transfer start monitoring timer T2 indicating a period from the start timing of paper feeding to the paper pick-up timing are respectively set by adding the first print delay time since the printer mechanically stops. Note that the time period T2 to pick up paper for the first and the third pages are longer by the first print delay time in the cassette as compared to T3 to pick up paper for the second and the fourth pages during continuous printing is executed as shown in FIG. 14.

Figure 15B:
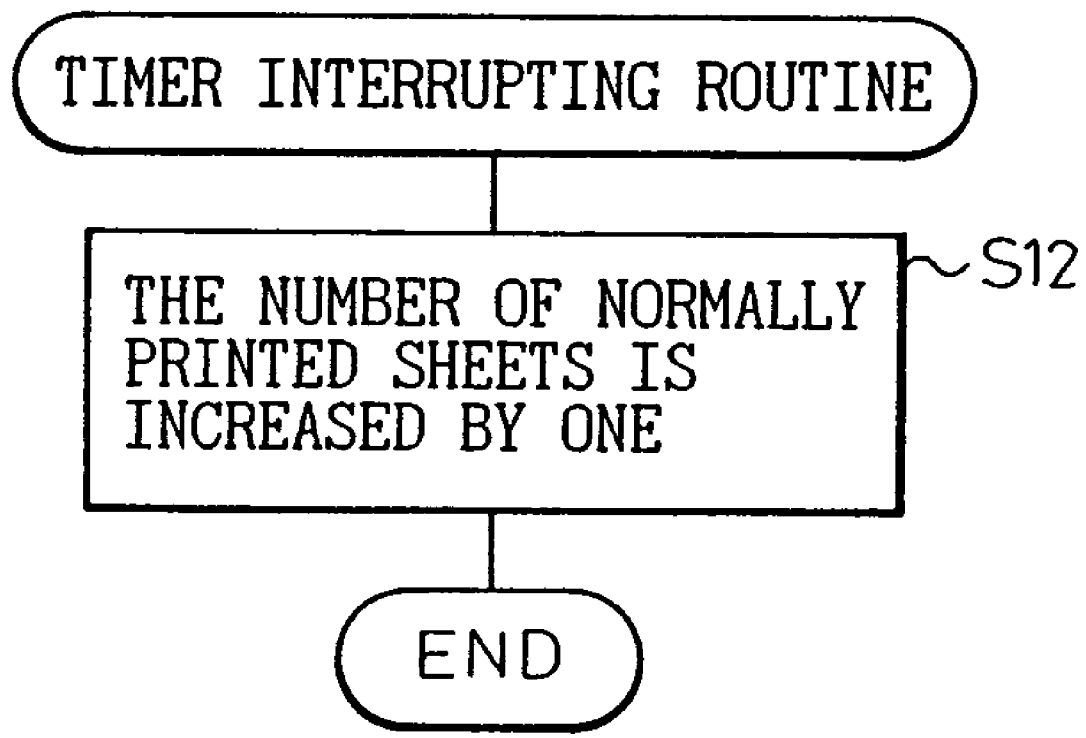
FIG. 15B is a flowchart showing a timer interrupting routine related to FIG. 15A.

FIG. 15A is a flowchart showing a fifth routine by the controller for counting the number of normally printed sheets printed by a page printer when a plurality of pages are continuously printed, and FIG. 15B is a flowchart showing a timer interrupting routine triggered by the fifth routine.

First of all, in step S1, whether or not the data transfer monitoring timer T2 for the previous page but one is counting is checked. If the result is YES, step S1 is repeated. If the result is NO, the process proceeds to step S2. In step S2, the printing data for one page is transferred to the printer 30. Then, in step S3, the number of printing data transferred pages is increased by one.

In step S4, whether or not the data transfer is for one page is checked. If the result is YES, step S6 proceeds. If the result is NO, step S5 proceeds. In step S5, whether or not the data transfer monitoring timer T2 for the previous page has been timed up is checked. If the result in step S5 is YES, a step S6 proceeds. If the result in step S5 is NO, step S7 proceeds. In step S6, the first print delay time in the cassette is read from the table as shown in FIG. 8A.

Next, in step S7, the monitoring time is calculated in accordance with the equation explained before. In step S8, the interruption timer is started. In step S9, whether or not the printer error has occurred is checked. If the result is YES, the process proceeds to step S11. If the result is NO, the process proceeds to step S10. In step S10, whether or not printing data for the next page has been prepared is checked, if the result is YES, the process returns to step S1 and steps S1 to S10 are repeated, if the result is NO, the process proceeds to step S11. In step S11, an error report is generated and the number of the normally printed pages is acquired.

When the monitoring time passes the preset time while the printer 30 does not generate any error, the timer interruption routine as shown in FIG. 15B, is started. In step S12, the number of normally printed sheets is increased by one.

The parameter table for monitoring printing time and used for calculating the number of normally printed sheets based on the paper size and the parameter table for calculating the delay time based on the cassette locations explained before are stored in the setting data storing unit. Data stored in these tables can be changed from the host 10 with the use of the function of TELENET supported by the printer controller 20.

Next, installation of programs of the invention will be described below. The printer controller 20 as shown in FIG. 2 comprises a CPU, a ROM, a RAM, an I/O interface and the like. Programs to make the controller 20 function as the network control unit 21, the printing data analyzing unit 22, the set data storing unit 23, the data transfer unit 24, the error processing unit 25 and the Centronics I/F unit 26 are run by the CPU, and the programs are stored in the ROM in advance and are written from the ROM to the RAM when the CPU runs the programs. These programs can be processed by a typical data processing system such as a personal computer or a workstation of which hardware consists of a CPU, an RAM as a main storage means, a hard disk as an auxiliary storage means, a display unit, a printer, an input device such as a keyboard and the like.

When installing the programs of the invention into such a computer system, the programs are recorded onto a portable recording medium such as a floppy disc or an optical disc, for example, a CD-ROM, in advance. The programs are loaded onto the main memory (RAM) in the computer system by means of a floppy disc drive or a CD-ROM drive. The programs may be directly written onto the memory with the use of the keyboard by operators. The programs can also be installed from a partner computer connected to the computer employed via a modem over telephone networks or via a terminal adapter over LANs. In this case, the programs may be installed to the auxiliary storage in the computer employed from a recording medium in the partner computer via the networks. The CPU writes the data installed in the auxiliary storage to the main memory, if necessary, and run the programs.

As heretofore explained, the printer controller according to the present invention is advantageous in the following points.

(1) The printer controller can minimize page skip and double printing when printing is resumed after an error occurred in a printer without providing a storage means for storing printing data, and can avoid the deterioration of the performance of the printer and can assure the printed data.

(2) Since the printer controller has a preset data storage unit for storing information of the printer connected to the printer controller and a plurality of analyzing units corresponding to different kinds of printers, the controller can properly work corresponding to functions of the printers connected thereto.

(3) Since the number of print completed pages is calculated based on the printing performance of the connected printer, even if a printer incapable of reporting the completion of paper feeding is connected, the printer controller can transfer the number of print completed pages to the host, and can avoid page skip and double printing, and can control the printer to reprint for each page.

It will be understood by those skilled in the art that the foregoing descriptions are preferred embodiments of the disclosed printer controller and that various changes and modifications may be made in the invention without departing from the spirit and scope thereof.

What is claimed is:

1. A controller that receives printing data for each page from a host, having a data transferring unit that transfers the printing data to a printer without having a storage unit for storing the printing data in the controller when printing is resumed after an error has occurred in the printer and controls the printer to print the printing data while monitoring states thereof is characterized in that it comprises:

an analyzing unit that analyzes the printing data and manages the number of pages transferred to the printer; and an error processing unit that passes error data and the number of pages of which printing have been completed to the host when an error occurred in the printer.

2. A controller according to claim 1 wherein, said controller further comprises a preset data storage unit that stores preset data of printers to be connected to the controller, said analyzing unit and said error processing unit execute the respective processes based on the preset data of a printer currently connected to the controller which is stored in the preset data storage unit.

3. A controller according to claim 2 wherein,
said controller further comprises a printer recognizing unit that inquires and recognizes functions of the printer connected to the controller,
said analyzing unit and said error processing unit execute the respective processes based on the functions of a printer currently connected to the controller recognized by the printer recognizing unit.

4. A controller according to claim 2 wherein,
said preset data storage unit stores preset data of the printer informed from the host in advance.

5. A controller according to claim 1 wherein,
said controller further comprises a printer recognizing unit that inquires and recognizes functions of the printer connected to the controller,
said analyzing unit and said error processing unit execute the respective processes based on the functions of a printer currently connected to the controller recognized by the printer recognizing unit.

6. A controller according to claim 5 wherein,
said preset data storage unit stores preset data of the printer informed from the host in advance.

7. A controller according to claim 1 wherein, when a printer incapable of transmitting a paper feed completion signal is connected to the controller, said error processing unit estimates the number of pages of which printing have been completed based on the performance of the printer and transmits the estimated number of pages with error data to the host.

8. A printing system comprising a host, a controller that receives printing data for each page transmitted from the host and a printer that receives the printing data from the controller and carries out printing while monitoring states of the printer by the controller, is characterized in that:
said controller comprises,
an analyzing unit that analyzes the printing data and manages the number of pages transferred to the printer, and
an error processing unit that passes error data and the number of pages of which printing have been completed to the host when an error occurred in the printer, wherein
when an error occurred in the printer,
said host transmits printing data of which printing has not been completed to the controller based on data informed by the controller after the printer is recovered by correcting the error,
said controller transfers said printing data to the printer and controls the printer to carry out re-printing for each page;
wherein the printer does not have a storage unit for storing the printing data when printing is resumed after an error has occurred in the printer.

9. A recording medium readable by computers on which programs are recorded which enable a computer to process the steps of receiving printing data for each page from a host, transferring the printing data to a printer and controlling the printer to print the printing data while monitoring states thereof, is characterized in that:
said programs enable said computer to function as an analyzing unit that analyzes the printing data and manages the number of pages transferred to the printer; and
an error processing unit that informs error data and the number of pages of which printing have been completed to the host when an error occurs in the printer;
wherein the printer does not have a storage unit for storing the printing data when printing is resumed after an error has occurred in the printer.

10. A recording medium according to claim 9 wherein,
said controller further comprises a preset data storage unit that stores preset data of printers to be connected to the controller,
said analyzing unit and said error processing unit execute the respective processes based on the preset data of a printer currently connected to the controller which is stored in the preset data storage unit.

11. A recording medium according to claim 10 wherein,
said preset data storage unit stores preset data of the printer informed from the host in advance.

12. A recording medium according to claim 9 wherein,
said controller further comprises a printer recognizing unit that inquires and recognizes functions of the printer connected to the controller,
said analyzing unit and said error processing unit execute the respective processes based on the functions of a printer currently connected to the controller recognized by the printer recognizing unit.

13. A recording medium according to claim 12 wherein,
said preset data storage unit stores preset data of the printer informed from the host in advance.

14. A recording medium according to claim 9 wherein, when a printer incapable of transmitting a paper feed completion signal is connected to the controller, said error processing unit estimates the number of pages of which printing have been completed based on the performance of the printer and transmits the estimated number of pages with error data to the host.

15. A controller that receives printing data for each page from a host, transfers the printing data to a printer and controls the printer to print the printing data while monitoring states thereof is characterized in that it comprises:
an analyzing unit that analyzes the printing data and manages the number of pages transferred to the printer;
an error processing unit that passes error data and the number of pages of which printing have been completed to the host when an error occurred in the printer; and
wherein said analyzing unit is provided with a plurality of analyzing units corresponding to different types of printers, and one of the analyzing units is selected corresponding to the type of printer connected to the controller.

16. A controller that receives printing data for each page from a host, having a data transferring unit that transfers the printing data to a printer without having a storage unit for storing the printing data in the controller and controls the printer to print the printing data while monitoring states thereof is characterized in that it comprises:
an analyzing unit that analyzes the printing data and manages the number of pages transferred to the printer; and
an error processing unit that passes error data and the number of pages of which printing have been completed to the host when an error occurred in the printer;
wherein said analyzing unit is provided with a plurality of analyzing units corresponding to different types of printers, and one of the analyzing units is selected corresponding to the type of printer connected to the controller;
wherein said controller further comprises a preset data storage unit that stores preset data of printers to be connected to the controller, and
wherein said analyzing unit and said error processing unit execute the respective processes based on the preset data of a printer currently connected to the controller which is stored in the preset data storage unit.

* * * * *